United States Patent
Flajslik et al.

(10) Patent No.: US 10,250,524 B2
(45) Date of Patent: Apr. 2, 2019

(54) TECHNOLOGIES FOR INCREASING BANDWIDTH IN PARTITIONED HIERARCHICAL NETWORKS

(71) Applicant: INTEL CORPORATION, Santa Clara, CA (US)

(72) Inventors: Mario Flajslik, Hudson, MA (US); Gene Wu, Austin, TX (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 15/274,715

(22) Filed: Sep. 23, 2016

(65) Prior Publication Data
US 2018/0091437 A1 Mar. 29, 2018

(51) Int. Cl.
*H04L 12/24* (2006.01)
*H04L 12/927* (2013.01)
*G06F 15/16* (2006.01)
*H04L 12/741* (2013.01)

(52) U.S. Cl.
CPC ........ *H04L 47/803* (2013.01); *H04L 41/0893* (2013.01); *H04L 41/0896* (2013.01); *H04L 45/745* (2013.01)

(58) Field of Classification Search
CPC .................. H04L 41/0893; H04L 45/745
USPC ........ 709/221, 226, 231, 235, 245; 370/250, 370/252, 254, 352
See application file for complete search history.

(56) References Cited

U.S. PATENT DOCUMENTS

| 8,000,336 | B2 * | 8/2011 | Harel | H04L 12/462 |
| | | | | 370/218 |
| 2006/0198368 | A1 * | 9/2006 | Guichard | H04L 12/4641 |
| | | | | 370/389 |
| 2010/0265849 | A1 * | 10/2010 | Harel | H04L 12/462 |
| | | | | 370/256 |
| 2010/0266278 | A1 * | 10/2010 | Wang | H04L 45/04 |
| | | | | 398/45 |
| 2011/0090892 | A1 * | 4/2011 | Cooke | H04L 12/2865 |
| | | | | 370/338 |

FOREIGN PATENT DOCUMENTS

WO 2010-146148 12/2010

OTHER PUBLICATIONS

"Consistency in Partitioned Networks"—Davidson et al, Cornell University, Sep. 1985 (Year: 1985) https://www.cs.cornell.edu/courses/cs614/2003sp/papers/DGS85.pdf.*

(Continued)

*Primary Examiner* — Randy A Scott
(74) *Attorney, Agent, or Firm* — Barnes & Thornburg LLP

(57) ABSTRACT

Technologies for increasing the bandwidth of partitioned hierarchical networks is disclosed. If each partition of network groups of a computer network are isolated, then the connections between the network groups of different partitions may go unused. However, careful selection of the network connections between partitions of different network groups may allow for a pseudo-direct connection between two network groups of the same partition using a single non-blocking switch in a network group of a different partition. Such a configuration can increase the effective bandwidth available within a partition without affecting the bandwidth available in another partition.

25 Claims, 8 Drawing Sheets

(56) References Cited

OTHER PUBLICATIONS

International search report for PCT application PCT/US2017/047324, dated Feb. 8, 2018 (3 pages).
Written opinion for PCT application PCT/US2017/047324, dated Feb. 8, 2018 (5 pages).
J. Kim et al., "Technology-Driven, Highly-Scalable Dragonfly Topology," Proc. 35th Ann. Intl. Symp. on Comp. Arch., pp. 77-88 (2008).

* cited by examiner

TECHNOLOGIES FOR INCREASING BANDWIDTH IN PARTITIONED HIERARCHICAL NETWORKS

GOVERNMENT RIGHTS CLAUSE

This invention was made with Government support under contract number B609815 awarded by the Department of Energy. The Government has certain rights in this invention.

BACKGROUND

High-performance computer networks, such as data centers, require processors and memory to be connected by high-speed networks. One approach for small-scale networks is to directly connect each compute device of the network to each other compute device of the network through a router. However, as more compute devices are added to a network, such an approach becomes impractical as the cost of the network connections grows.

To address the cost of network connections, the compute devices of the network may be grouped into local network groups of a relatively small number of compute devices. Among each network group, each compute device is connected to a router in the network group, and each router is connected to each other router in the same network group. Additionally, one router in each network group is connected to a router in each other network group. Through this hierarchical organization, each compute device is connected to each other compute device through one or more intra-group network connections and one inter-group network connection.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 9 is a diagram of one embodiment of a connection matrix that may be used to configure the computer network of FIG. 1; and FIG. 10 is a diagram of one embodiment of a connection matrix that may be used to configure the computer network of FIG. 1.

DETAILED DESCRIPTION OF THE DRAWINGS

Figure 1:
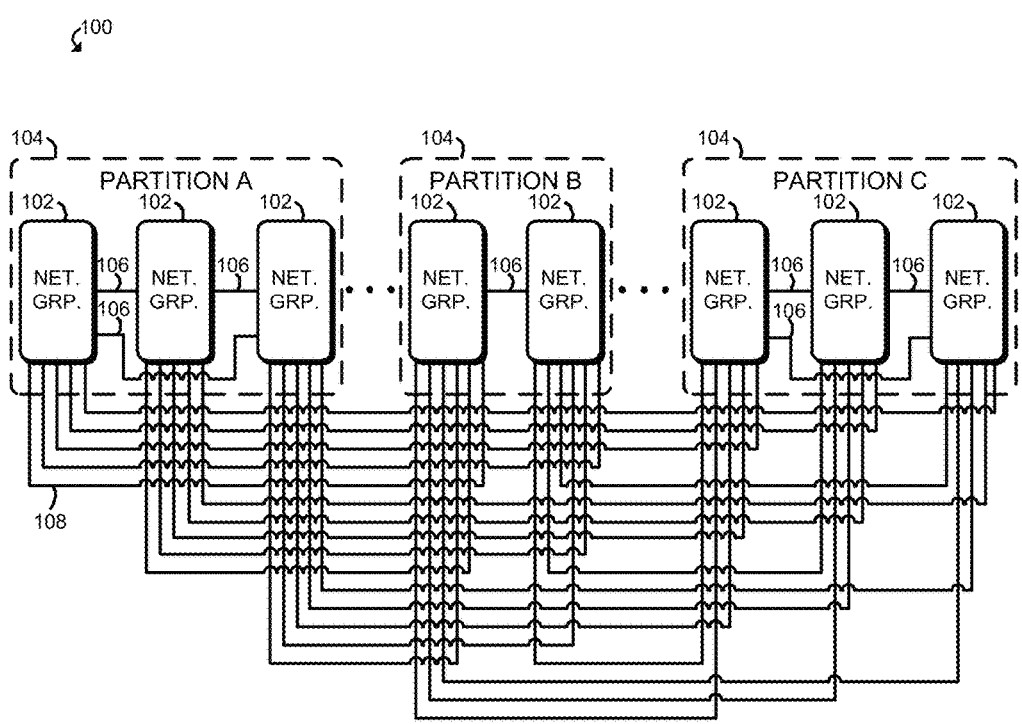
FIG. 1 is a simplified block diagrams of at least one embodiment of a computer network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
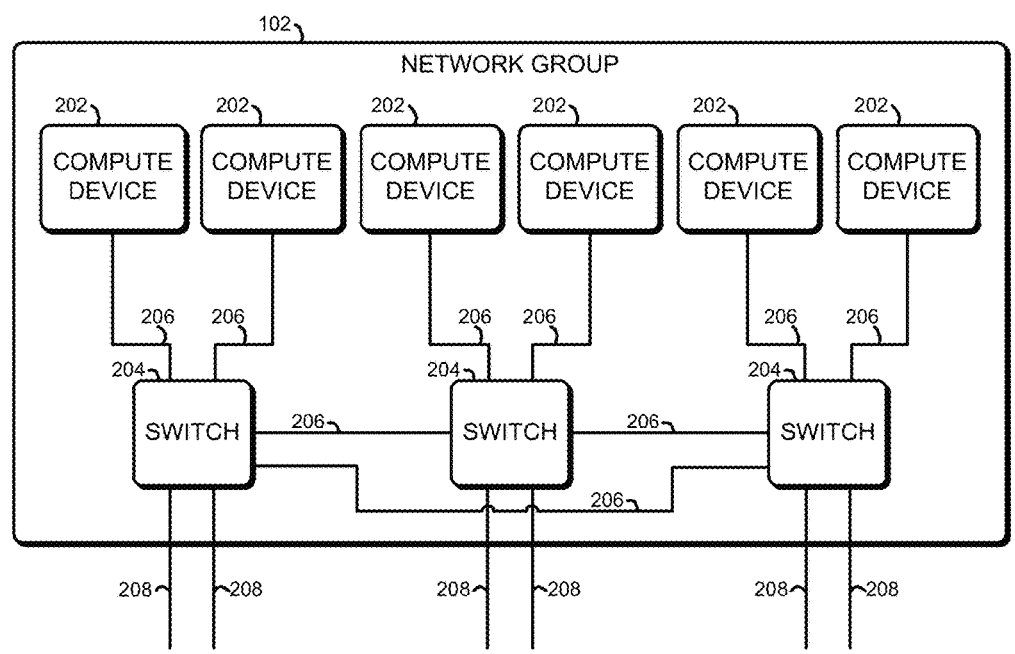
FIG. 2 is a simplified block diagram of at least one embodiment of a network group of the computer network of FIG. 1.

Referring now to FIG. 1, an illustrative computer network 100 includes several network groups 102 divided into partitions 104 and connected by several intra-partition network connections 106 and several inter-partition network connections 108. As shown in FIG. 2, the network connections to or from a network group 102 may be connected to any of several switches 204 in the network group 102. In use, and as described in more detail below, each partition 104 may be configured to be isolated from all of the other components of the network. In particular, each partition 104 may be configured such that no network traffic from another partition 104 may use any bandwidth that would otherwise be available for communication within the partition 104. This condition may be desired, for example, in order to guarantee a certain level of performance for any given partition 104. Since, in general, inter-partition network connections 108 to a network group 102 may be connected to any switch 204 of the network group 102, any external traffic routed through a network group 102 of a partition 104 would require use of a network connection from one switch 204 to another switch 204 of the same network group 102. Because such use would limit the bandwidth available for communication within the partition 104, routing that external traffic would not be permitted in an isolated partition 104. It should be appreciated that such a scenario may result in significant amount of possible bandwidth in the inter-partition network connections 108 to an isolated partition 104 going unused.

If, however, the external traffic could be routed through a network group 102 of the isolated partition 104 without using any network connection within the network group 102, that routing would be permitted. Such a routing could be done if both the source and destination of the traffic were connected to the same switch 204. By careful configuration of inter-partition network connections 108 between network groups 102, external traffic can be routed through the switches 204 of an isolated partition 104. In particular, in some embodiments, an isolated partition 104 may be used to provide an additional connection between each pair of network groups 102 of a different partition 104.

The network groups 102 of the computer network 100, as discussed in more detail below in regard to FIG. 2, may be any logical or physical organization of devices capable of performing computing and routing of network traffic. The partitions 104 of the computer network 100 form a logical grouping of the network groups 102 that may be implemented by, for example, configuring each device of the partition 104 that it is a member of that partition 104. In the illustrative embodiment, any network group 102 may be assigned to be part of a partition 104 without any regard to the physical location of the individual devices in that network group 102 (i.e., the devices of the network group 102 may be located physically close to or physically far from other network groups 102 of the partition 104). In some embodiments, the network groups 102 may be assigned to a partition 104 based on physical distance of the corresponding devices.

The network connections of the computer network 100, such as the intra-partition network connections 106 and the inter-partition network connections 108 may be embodied as any type of cable usable as a network connection, such as an electrical cable (e.g., Ethernet cable), an active optical cable (e.g., INTEL Connects Cable), or an optical cable (e.g., fiber optic cable). In the illustrative embodiment, the partitioning of the network groups 102 into partitions 104 may be done at any time, including after physical network connections have been implemented, without changing those connections. As such, there may be no physical distinction between the inter-partition network connections 108 and the intra-partition network connections 106. Of course, in some embodiments, different types of network connections may be used for inter-partition network connections 108 as for intra-partition network connections 106. It should be appreciated that, in the illustrative embodiment and as shown in FIG. 1, each network group 102 is connected to each other network group 102 through exactly one network connection (i.e., either an intra-partition network connection 106 or an inter-partition network connection 108). Of course, in some embodiments, any two network groups 102 may be connected through more than one network connection, or may not be connected at all. Although shown with three partitions 104 and eight network groups 102 in FIG. 1, it should be appreciated that the computer network 100 may have any number of partitions 104 and/or network groups 102. For example, the compute network could have 1, 2, 5, 10, 20, 50, 100, 200, or 500 partitions 104 and/or network groups 102 or any combination thereof.

Referring back to FIG. 2, an illustrative network group 102 includes one or more compute devices 202, one or more switches 204, intra-group network connections 206, and inter-group network connections 208. As described in more detail below in regard to FIG. 4, the compute device 202 may be any device capable of performing computation, such as a server computer. Additionally, as described in more detail below in regard to FIG. 5, the switch 204 may be any device capable of switching or routing network traffic.

The intra-group network connections 206 may be embodied as any type of cable usable as a network connection, such as an electrical cable (e.g., Ethernet cable), an active optical cable (e.g., INTEL Connects Cable), or an optical cable (e.g., fiber optic cable). The inter-group network connections 208 may connect to any other network group 102, such as a network group 102 in the same partition 104 (in which case the inter-group network connection 208 would be an intra-partition network connection 106) or a network group 102 in a different partition 104 (in which case the inter-group network connection 208 would be an inter-partition network connection 108). It should be appreciated that each intra-partition network connection 106 and each inter-partition network connection 108 is also an inter-group network connection 208. In the illustrative embodiment, the intra-group network connections 206 and the inter-group network connections 208 are all embodied as the same type of cable (such as an active optical cable). In some embodiments, some or all of the intra-group network connections 206 may embodied as a different type of cable from the inter-group network connections 208. For example, the intra-group network connections 206 may be embodied as electrical cables, and the inter-group network connections 208 may be embodied as active optical cables.

Although shown with three switches 204 and six compute devices 202 in FIG. 2, it should be appreciated that each network group 102 of the computer network 100 may have any number of switches 204 and/or compute devices 202. For example, each network group 102 could have 1, 2, 5, 10, 20, 50, 100, 200, or 500 switches 204 and/or compute devices 202 or any combination thereof.

Figure 3A:
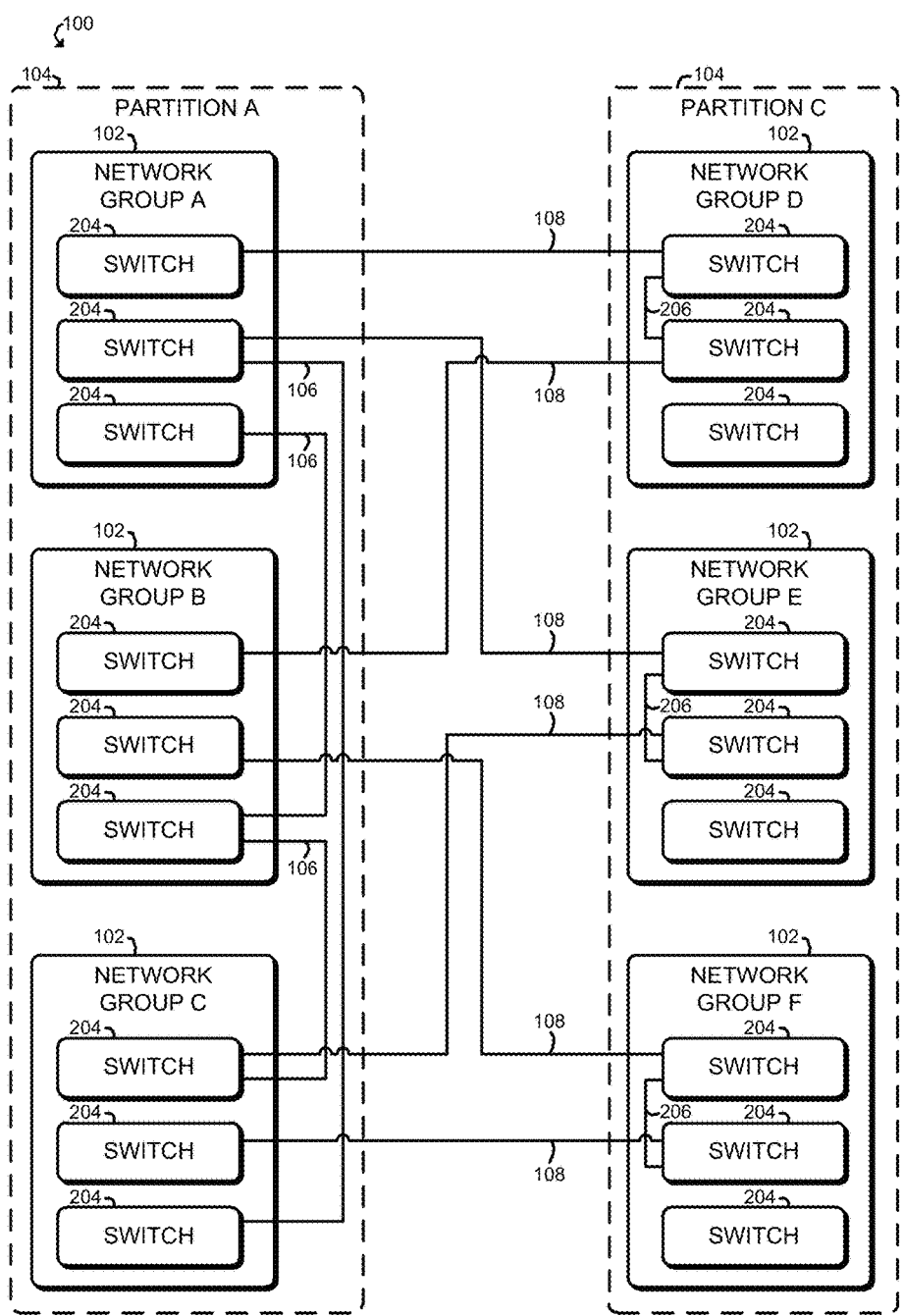
FIGS. 3A and 3B are simplified block diagrams of at least one embodiment of a portion of the computer network of FIG. 1.

Referring now to FIG. 3A, an illustrative embodiment of the computer network 100 is shown with two partitions 104 and some of the corresponding intra-partition network connections 106 and inter-partition network connections 108 (note that additional connections may be present but not shown). In particular, each intra-partition network connection 106 of partition A 104 is shown, as are some of the inter-partition network connections 108 between partitions A 104 and partition C 104. In some use cases, the desired bandwidth of intra-partition communication of partition A may exceed the bandwidth available with the intra-partition network connections 106 of partition A. In general, additional bandwidth may be used by routing intra-partition communication over inter-partition network connections 108 connected to another partition 104, such as partition C 104. However, if partition C 104 is configured to be isolated, intra-partition communication of partition A 104 could not be routed through partition C 104 as shown in FIG. 3A, since it would need to use the intra-group network connection 206.

Figure 3B:
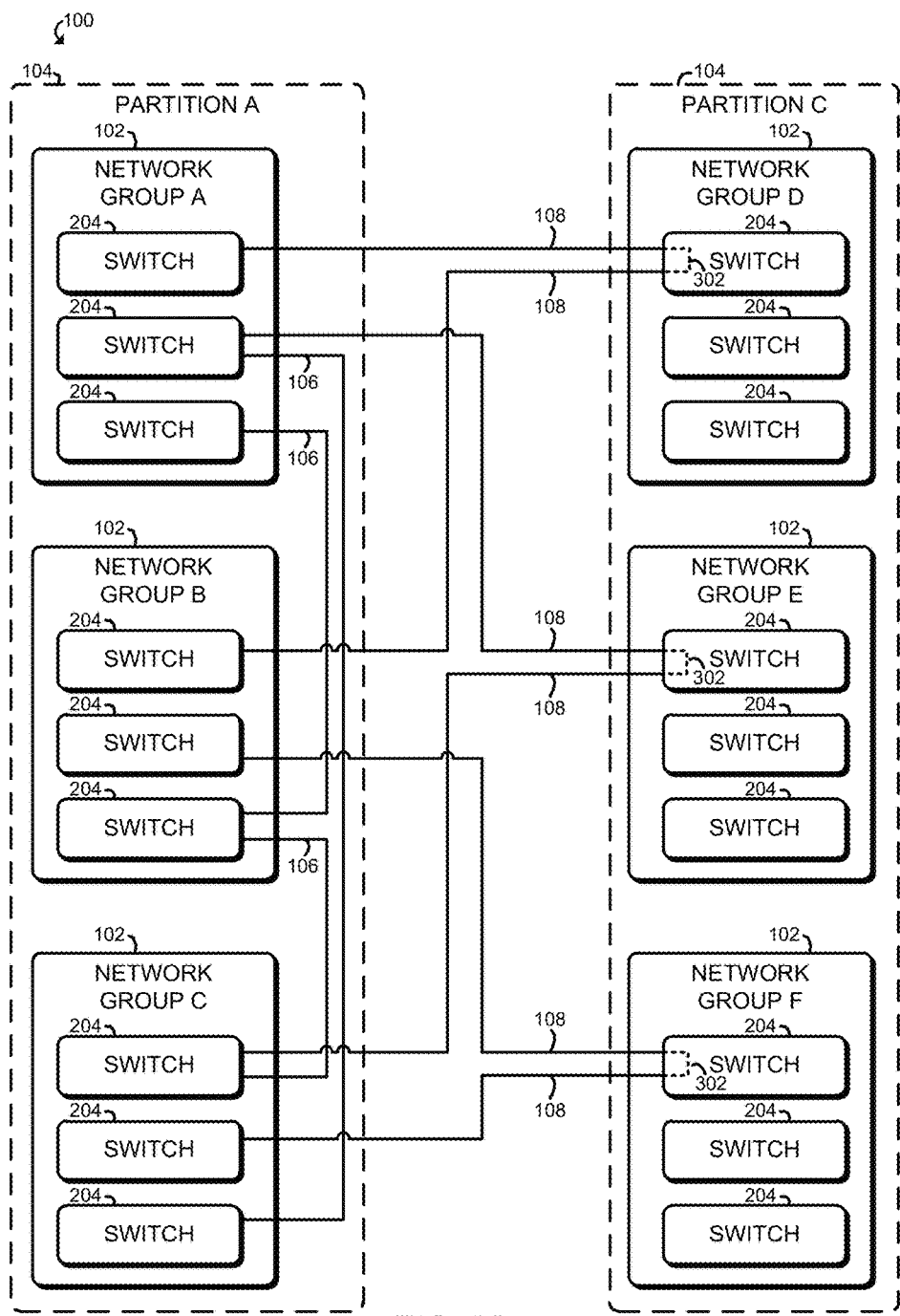

However, if two inter-partition network connections 108 were connected to the same switch 204 of partition C 104, as shown in FIG. 3B, no intra-group network connection 206 in partition C 104 would need to be used. Instead, a pseudo-direct connection can be made through two inter-partition network connections 108 and a single switch 204, with the switch 204 configured to route all traffic from one of those inter-partition network connections 108 to the other. In FIG. 3B, that routing condition is represented by a link 302 in the switches 204 in question. As described in more detail below in regard to FIG. 7, the link 302 may be implemented by an entry in a routing table. It should be appreciated that the pseudo-direct network connections do not require any connections in addition to the inter-group network connections 208 which may already be in place in a hierarchical network, but only requires careful selection of which switch 204 of partition C 104 each inter-group network connection 208 is connected to.

Figure 4:
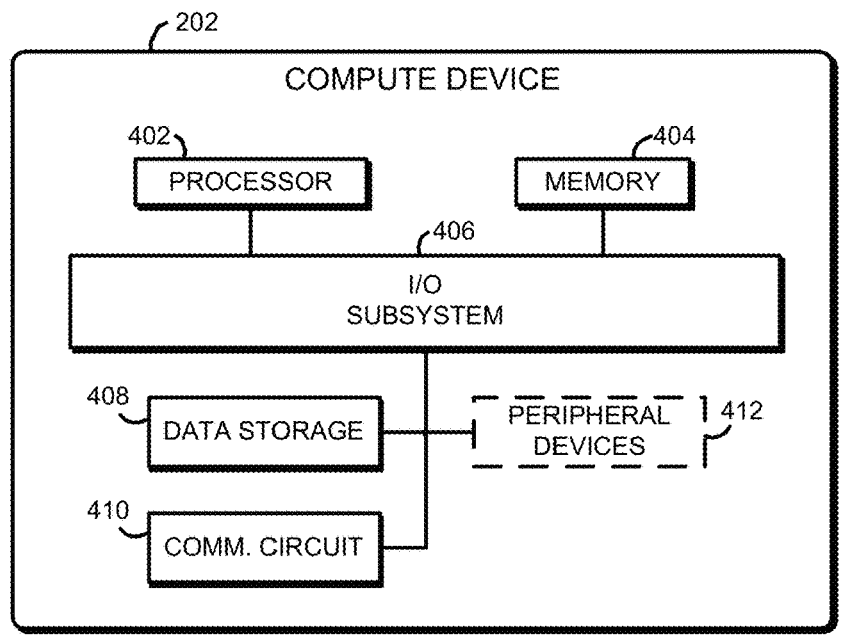
FIG. 4 is a simplified block diagram of at least one embodiment of a compute device of the computer network of FIG. 1.

Referring now to FIG. 4, the illustrative compute device 202 may be embodied as any type of compute device capable of performing the functions described herein. It should be appreciated that, in addition to performing calculations as part of the computer network 100, the compute device 202 may, in some embodiments, perform some or all of a method for determining the network connections that should be made to configure the computer network 100, as described in more detail below in regard to FIGS. 6 and 8. Of course, in such an embodiment, the compute device 202 need not be part of the computer network 100.

The compute device 202 may be embodied as or otherwise be included in, without limitation, a server computer, a desktop computer, an embedded computing system, a System-on-a-Chip (SoC), a tablet computer, a notebook computer, a laptop computer, a smartphone, a cellular phone, a wearable computer, a handset, a messaging device, a camera device, a multiprocessor system, a processor-based system, a consumer electronic device, and/or any other computing device. The illustrative compute device 202 includes a processor 402, a memory 404, an input/output (I/O) subsystem 406, data storage 408, and a communication circuit 410. In some embodiments, one or more of the illustrative components of the compute device 202 may be incorporated in, or otherwise form a portion of, another component. For example, the memory 404, or portions thereof, may be incorporated in the processor 402 in some embodiments.

The processor 402 may be embodied as any type of processor capable of performing the functions described herein. For example, the processor 402 may be embodied as a single or multi-core processor(s), a single or multi-socket processor, a digital signal processor, a graphics processor, a microcontroller, or other processor or processing/controlling circuit. Similarly, the memory 404 may be embodied as any type of volatile or non-volatile memory or data storage capable of performing the functions described herein. In operation, the memory 404 may store various data and software used during operation of the compute device 202 such as operating systems, applications, programs, libraries, and drivers. The memory 404 is communicatively coupled to the processor 402 via the I/O subsystem 406, which may be embodied as circuitry and/or components to facilitate input/output operations with the processor 402, the memory 404, and other components of the compute device 202. For example, the I/O subsystem 406 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 406 may form a portion of a system-on-a-chip (SoC) and be incorporated, along with the processor 402, the memory 404, and other components of the compute device 202 on a single integrated circuit chip.

The data storage 408 may be embodied as any type of device or devices configured for the short-term or long-term storage of data. For example, the data storage 408 may include any one or more memory devices and circuits, memory cards, hard disk drives, solid-state drives, or other data storage devices.

The communication circuit 410 may be embodied as any type of communication circuit, device, or collection thereof, capable of enabling communications between the compute device 202 and other devices. To do so, the communication circuit 410 may be configured to use any one or more communication technology and associated protocols associated with the network connections described above (i.e., electrical cables, active optical cables, or optical cables) to effect such communication. Of course, in some embodiments, the communication circuit 410 may be capable of using additional communication technology, such as wireless communication, including Bluetooth®, Wi-Fi®, WiMAX, near field communication (NFC), etc.

In some embodiments, the compute device 202 may include other or additional components, such as those commonly found in a compute device. For example, the compute device 202 may also have peripheral devices 412. The peripheral devices 412 may include a keyboard, a mouse, a display, etc.

Figure 5:
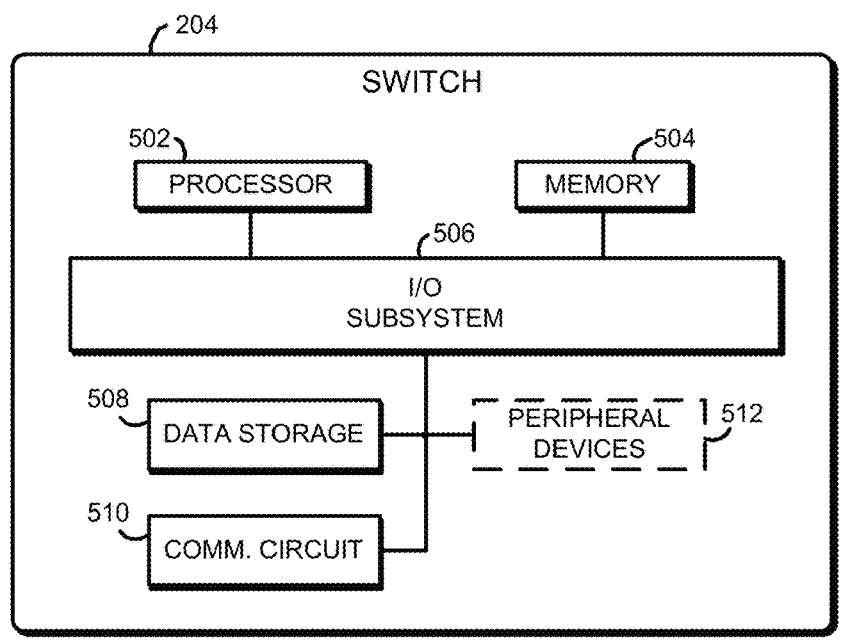
FIG. 5 is a simplified block diagram of at least one embodiment of a switch of the computer network of FIG. 1.

Referring now to FIG. 5, the switch 204 may be embodied as any type of device capable of performing the functions described herein. For example, in some embodiments, the switch 204 may be embodied as a network switch, a router, a network hub, a desktop computer, a server computer, an embedded computing system, a System-on-a-Chip (SoC), a tablet computer, a notebook computer, a laptop computer, a smartphone, a cellular phone, a wearable computer, a handset, a messaging device, a camera device, a multiprocessor system, a processor-based system, a consumer electronic device, and/or any other computing device. As shown in FIG. 5, the illustrative switch 204 includes a processor 502, a memory 504, an I/O subsystem 506, data storage 508, a communication circuit 510, and, optionally, peripheral devices 512. Each of the processor 502, the memory 504, the I/O subsystem 506, the data storage 508, and the optional peripheral devices 512 may be similar to the corresponding components of the compute device 202. As such, the description of those components of the compute system 202 is equally applicable to the description of those components of the switch 204 and is not repeated herein for clarity of the description. It should be appreciated, however, that each of the switch 204 and the compute device 202 may be adapted for the specific functions described herein. For example, the processor 402 of the compute device may be adapted to perform general computation, while the processor 502 of the switch (along with the I/O subsystem 506, the memory 504, the communication circuit 510, etc.) may be adapted to efficiently route network traffic.

The communication circuit 510 may be similar to the communication circuit 410 described above in regard to FIG. 4. However, it should be appreciated in particular that the communication circuit 510 may include a large number of ports, each port being capable of interfacing with a network connection such as an electrical cable. Of course, in some embodiments, the communication circuit 410 of the compute device 202 may also include more than one port.

Figure 6:
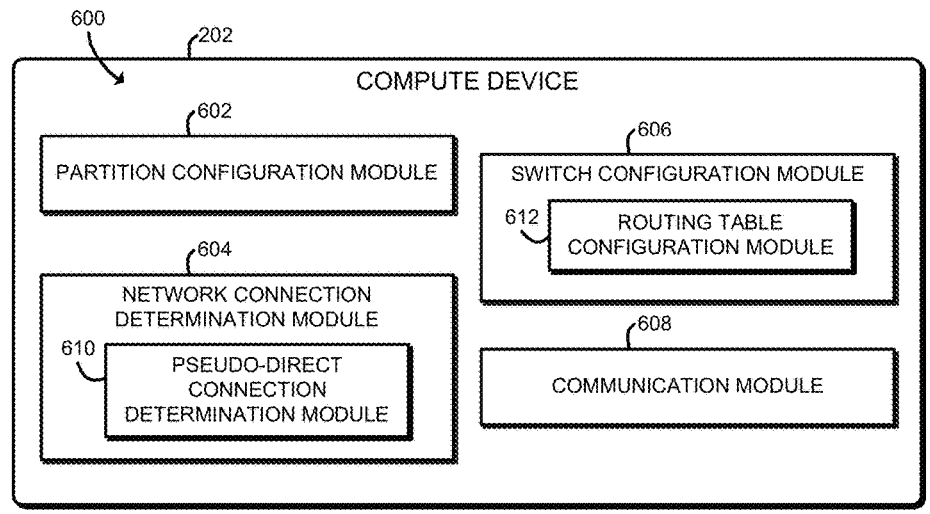
FIG. 6 is a block diagram of at least one embodiment of an environment that may be established by the compute device of FIG. 4.

Referring now to FIG. 6, in use, the compute device 202 may establish an illustrative environment 600. The illustrative environment 600 includes a partition configuration module 602, a network connection determination module 604, a switch configuration module 606, and a communication module 608. The various modules of the environment 600 may be embodied as hardware, software, firmware, or a combination thereof. For example, the various modules, logic, and other components of the environment 600 may form a portion of, or otherwise be established by, the processor 402 or other hardware components of the compute device 202. As such, in some embodiments, one or more of the modules of the environment 600 may be embodied as circuitry or collection of electrical devices (e.g., a partition configuration circuit 602, a network determination circuit 604, a switch configuration circuit 606, etc.). It should be appreciated that, in such embodiments, one or more of the circuits (e.g., the partition configuration circuit 602, the network determination circuit 604, the switch configuration circuit 606, etc.) may form a portion of one or more of the processor 402, the memory 404, the I/O subsystem 406, and/or the data storage 408. Additionally, in some embodiments, one or more of the illustrative modules may form a portion of another module and/or one or more of the illustrative modules may be independent of one another.

The partition configuration module 602 is configured to determine a partitioning of the network groups 102. In the illustrative embodiment, the partition configuration module 602 may assign a certain number of network groups 102 to one of several possible partitions 104 for the purposes of determining, e.g., the desired physical connections between the network groups 102, but does not actually configure any network groups 102. The partition configuration module 602 may even configure partitions 104 of a computer network 100 that does not yet exist. Of course, in some embodiments, the partition configuration module 602 may additionally configure the network groups 102 to be a part of a certain partition 104, such as by configuring each compute device 202 and/or each switch 204 of the partition 104.

The network connection determination module 604 is configured to determine which intra-group network connections 206 and which inter-group network connections 208 should be connected in the computer network 100. In particular, the network connection determination module 604 includes a pseudo-direct connection determination module 610, which is configured to determine which switches 204 the inter-group network connections 208 should be connected to such that pseudo-direct connections can be implemented. In the illustrative embodiment, the pseudo-direct connection determination module 610 may employ Latin squares to determine the inter-group network connections 208, as discussed in more detail below in regard to FIGS. 8-10. A Latin square is defined as an N by N matrix that has each number of N numbers appearing once in each column and in each row. In the illustrative embodiment, the network connection determination module 604 may be configured to determine an intra-group network connection 206 between each switch 204 of each network group 102, and between each compute device 202 of each network group 102 and a switch 204 of the corresponding network group 102.

The switch configuration module 606 is configured to configure the switches 204 of the computer network 100 to properly route traffic on the switches 204. In particular, the switch configuration module 606 includes a routing table configuration module 612 which is configured to configure a routing table of a switch 204, as discussed in more detail below in regard to FIG. 7.

The communication module 608 is configured to communicate with other devices, such as other compute devices 202 or switches 204. In the illustrative embodiment, the communication module 608 may communicate with other compute devices 202 or switches 204 in order to configure those devices, such as by assigning them to a partition 104. In other embodiments, such as ones in which the compute device 202 is part of the computer network 100, the communication module 608 may be configured to communicate with other compute devices 202 of the computer network 100 as part of performing a calculation or processing data.

Figure 7:
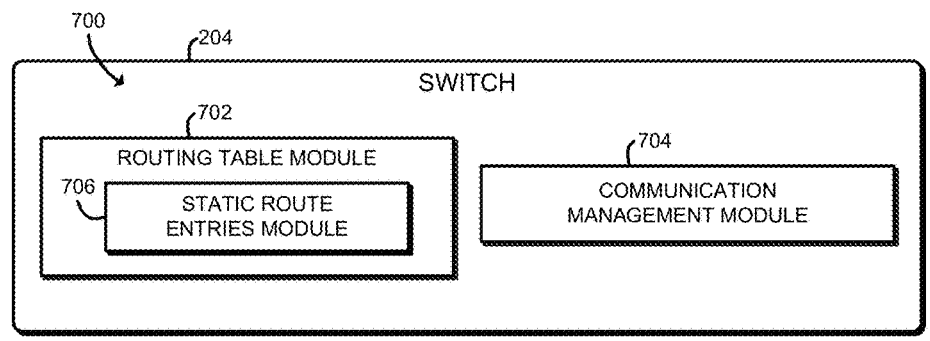
FIG. 7 is a block diagram of at least one embodiment of an environment that may be established by the switch of FIG. 5.

Referring now to FIG. 7, in use, the switch 204 may establish an illustrative environment 700. The illustrative environment 700 includes a routing table module 702 and a communication management module 704. The various modules of the environment 700 may be embodied as hardware, software, firmware, or a combination thereof. For example, the various modules, logic, and other components of the environment 700 may form a portion of, or otherwise be established by, the processor 502 or other hardware components of the switch 204. As such, in some embodiments, one or more of the modules of the environment 700 may be embodied as circuitry or collection of electrical devices (e.g., a routing table circuit 702 and a communication management circuit 704). It should be appreciated that, in such embodiments, one or more of the circuits (e.g., the routing table circuit 702 and the communication management circuit 704) may form a portion of one or more of the processor 502, the memory 504, the I/O subsystem 506, and/or the data storage 508. Additionally, in some embodiments, one or more of the illustrative modules may form a portion of another module and/or one or more of the illustrative modules may be independent of one another.

The routing table module 702 is configured to store information that may be used to route network traffic. The routing table module 702 may list routes to particular destinations, such as routes to certain partitions 104, network groups 102, switches 204, and/or compute devices 202. In some embodiments, the routing table module 702 may also indicate a metric for some or all of the routes stored in the routing table module 702, such as an indication of the latency, bandwidth, etc. associated with a given route. The routing table module 702 may also include information about the topology of the computer network 100, such as which switches 204 are connected to which other switches 204. In some embodiments, the routing table module 702 may be configured to discover information relating to the topology of the computer network 100, such as by communicating with other switches 204 to which the switch 204 is connected. In some embodiments, the routing table module 702 may include an indication that certain routes may only be used by certain connections. For example, if a partition 104 is configured to be isolated, the switches 204 in that partition 104 may be configured not to route communication from an inter-partition network connection 108 over an intra-partition network connection 106.

In the illustrative embodiment, the routing table module 702 includes static route entries module 706. The static route entries module 706 may indicate that a certain route will always be used for certain traffic. For example, when two inter-group network connections 208 are connected to the same switch 204 in order to form a pseudo-direct connection, that switch 204 may have a static route entry in the static routes entries module 706 indicating that traffic from one of those inter-group network connections 208 should always be routed to the other inter-group network connection 208.

The communication management module 704, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other devices, such as compute devices 202 and other switches 204. To do so, the communication management module 704 is configured to receive and process network packets from other devices via network connections. Additionally, the communication management module 704 is configured to prepare and transmit network packets to other devices via network connections. Accordingly, in some embodiments, at least a portion of the functionality of the communication management module 704 may be performed by the communication circuit 510 of the switch 204. The communication management module 704 may use the information contained in the routing table module 702 to manage network communication. In the illustrative embodiment, the communication circuit 510 and the communication management module 704 are non-blocking. In other words, the switch 204 may maintain the maximum bandwidth of each network connection connected to the switch 204, and therefore communication on one network connection will not interfere with communication on another network connection to which the communication is not routed. Of course, in some embodiments, the communication circuit 510 and/or the communication management module 704 may be blocking.

Figure 8:
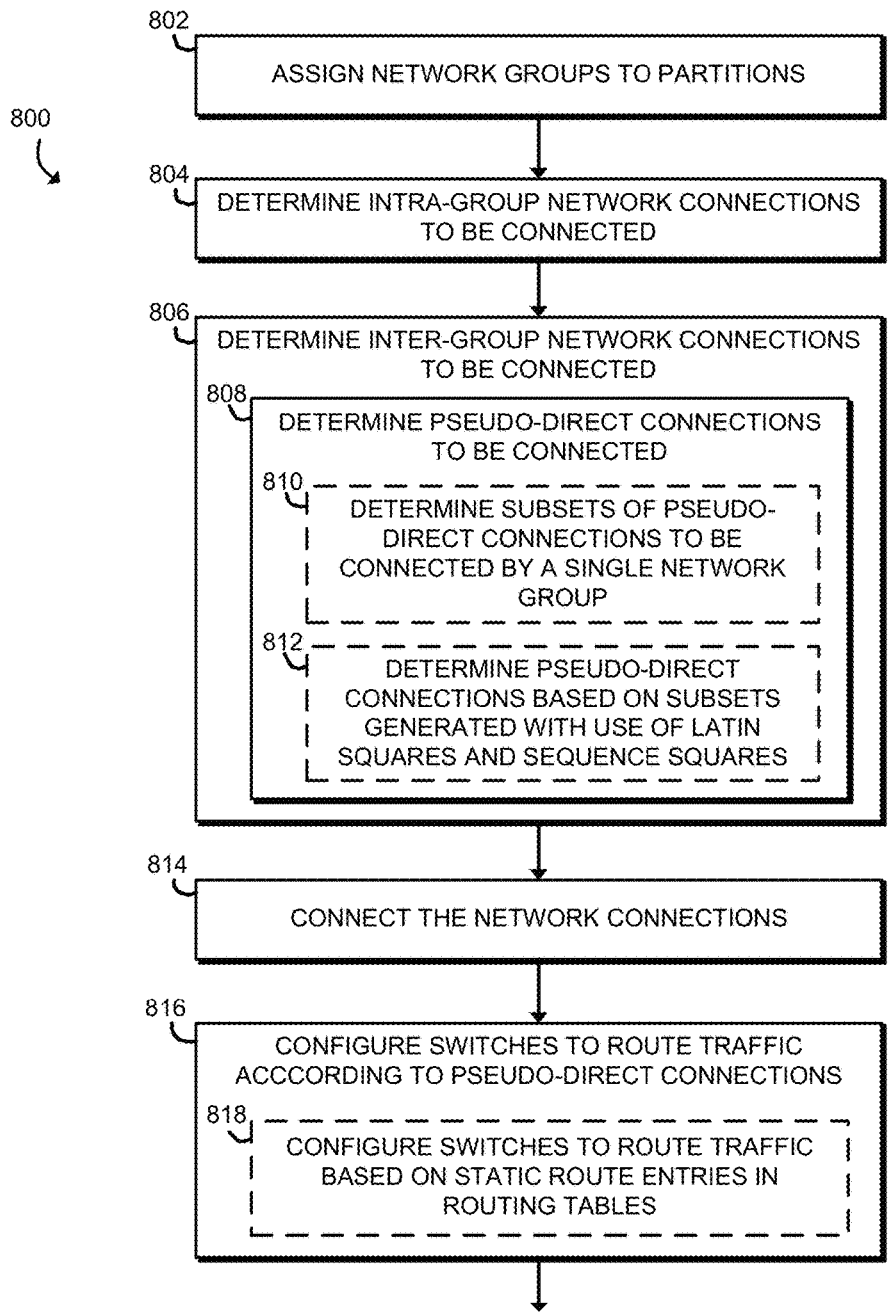
FIG. 8 is a simplified flow diagram of at least one embodiment of a method for configuring the computer network of FIG. 1.

Referring now to FIG. 8, in use, a method 800 may be executed to configure a computer network 100. It should be appreciated that, in some embodiments, some or all of the steps of the method 800 may be executed by one or more of the modules of the compute device 202 as shown in FIG. 4. Additionally or alternatively, some or all the steps of the method may be executed by an administrator of the computer network 100 (i.e., a person who administers the computer network 100). While the individual steps will be described as being performed by only the compute device 202 or the administrator, at least some of the steps may be performed by either the compute device 202 or the administrator.

The method 800 begins in block 802, in which the compute device 202 assigns several network groups 102 of the computer network 100 to partitions 104. As discussed above, the network groups 102 may be part of a physical computer network 100 that already exists, or the network groups 102 may be assigned as part of configuring a future computer network 100. It should be appreciated that the network groups 102 may be assigned to partitions 104 temporarily for the purpose of configuring the pseudo-direct connections for a future partitioning that may have a different arrangement than a present partitioning.

In block 804, the compute device 202 determines intra-group network connections 206 to be connected for each network group 102. As discussed above, in the illustrative embodiment, each switch 204 of each network group 102 is to be connected to each other switch 204 of the same network group 102 with an intra-group network connection 206. Additionally, each compute device 202 of each network group 102 is to be connected to at least one switch 204 of that network group 102. In some embodiments, there may be more or fewer intra-group network connections 206 between any two of the compute devices 202 or switches 204 of each network group 102.

In block 806, the compute device 202 determines inter-group network connections 208 to be connected. As discussed above, in the illustrative embodiment, there is an inter-group network connection 208 to be connected for each pair of network groups 102 that can be selected from all of the network groups 102. For example, if there are three network groups 102 (network group A 102, network group B 102, and network group C 102), the set of pairs of network groups 102 that could be selected would be (network group A 102, network group B 102), (network group A 102, network group C 102), and (network group B 102, network group C 102). In general (i.e., when not considering pseudo-direct connections), each inter-group network connection 208 may be connected to any switch 204 in the network group 102 to which it is connected.

As part of determining the inter-group network connections 208 to be connected, the compute device 202 determines pseudo-direct connections to be connected in block 808. As discussed above, a pseudo-direct connection is made up of an inter-group network connection 208 from a first network group 102 in a partition 104 to a switch 204 in a different partition 104 and another inter-group network connection 208 from a second network group 106 in the same partition 104 as the first network group 102 to the same switch 204, with the switch 204 configured to direct all traffic received from one of the inter-group network connections 208 to the other inter-group network connection 208. In the illustrative embodiment, the compute device 202 determines a pseudo-direct connection to be connected for each pair of network groups 102 that can be selected from all of the network groups 102 of a selected partition 104. For example, if the selected partition 104 has network groups 102 A, B, C, and D, the set of pairs of network groups 102 that can be selected are (A, B), (A, C), (A, D), (B, C), (B, D), and (C, D). In general, if the selected partition 104 has n network groups 102, there will be n(n−1)/2 possible pairs that can be selected, and so there will be n(n−1)/2 pseudo-direct connections to be connected. Of course, in some embodiments, there may be more or fewer pseudo-direct connections connecting pairs of network groups 102 of any given partition 104.

Once the pairs of network groups 102 to be connected through pseudo-direct connections are determined, the switches 204 which form part of the pseudo-direct connection must be selected. It should be appreciated that, as shown previously in FIG. 3A, just because any two network groups 102 are both connected to a third network group 102, the two network groups 102 are not necessarily connected to the same switch 204 in the third network group 102. As such, part of determining the pseudo-direct connections to be connected is determining which switch 204 the corresponding inter-group network connections 208 should be connected to. It should further be appreciated that any given network group 102 is only guaranteed to have a single connection to each other network group 102. For this reason, a network group 102 cannot, for example, be used to implement the switch 204 of the pseudo-direct connection for each of pairs of network groups 102 (A, B) and (A, C), since there may only be one connection to network group A 102.

It should be appreciated that, since each network group 102 of the computer network 100 is connected to each other network group 102, each network group 102 is of course connected to each of the network groups 102 of the selected partition 104 as well. In some embodiments, this fact can be leveraged in block 810 to configure the pseudo-direct connections by determining subsets of the pseudo-direct connections that can be implemented by a single network group 102. Continuing the example above with the selected partition 104 having network groups 102 A, B, C, and D, subset 1 of the possible pseudo-direct connections could be (A, B) and (C, D), subset 2 could be (A, C) and (B, D), and subset 3 could be (B, C) and (A, D). Note that each possible pair of network groups 102 appears in one of the subsets, and that every network group 102 of the selected partition 104 appears exactly once in each subset (if there are an odd number of network groups 102 in the selected partition 104, one will be left out in each subset). This property allows for a given subset to be implemented with the switches 204 of a single network group 102 not in the selected partition 104, since each network group 102 has a connection to each other network group 102. Additionally, if the selected partition 104 has n network groups 102, there will be n–1 (if n is even) or n (if n is odd) subsets, which will allow all of the pseudo-direct connections be implemented with the inter-group network connections 208 to another partition 104 of the same number of network groups 102.

It should be appreciated, in general, the desired property of the subsets of possible pairs of network groups 102 is that each subset of pairs contains each network group 102 (leaving one out if there is an odd number of network groups 102), and that each possible pairs of network groups 102 appears once in the subsets. In some embodiments, the subsets of possible pairs of network groups 102 may be determined based on subsets of pairs generated with use of Latin squares and sequence squares, as described in more detail in regard to FIGS. 9 & 10. Of course, it should be appreciated that the methods described in blocks 810 and 812 are merely one possible approach to determining the switches 204 to be used for the pseudo-direct connections. In other embodiments, any other approach may be used which results in the appropriate connections as described above.

In block 814, the administrator of the computer network 100 connects the network connections between the switches 204 of the computer network 100. In block 816, the compute device 202 configures the switches 204 to route traffic according to the pseudo-direct connections. In the illustrative embodiment, the compute device 202 configures the switches 204 to route traffic based on static route entries in the routing tables of the switches 204 in block 818. It should be appreciated that the configuration of the switches 204 depends on the configuration of the partitions 104, since the traffic routing condition of a given pseudo-direct connection need only be enforced when the partition 104 containing the switch 204 of the pseudo-direct connections is configured to be isolated.

It should be appreciated that the method 800 may not use every available resource (i.e., may not use every available inter-group network connection 208) to implement a pseudo-direct connection between each pair of network groups 102 of the selected partition 104. In fact, additional inter-group network connections 208 of the computer network 100 can be used to implement additional pseudo-direct connections. In particular, if there are several partitions 104 with the same number of network groups 102, the inter-partition network connections 108 between any two partitions 104 can be used to implement pseudo-direct connections between each pair of the network groups 102 of one of the partitions 104. For example, if there are three partitions 104, partition A 104, partition B 104, and partition C 104, then the inter-group network connections 208 between partitions A and B 104 can be used to implement pseudo-direct connections for each pair of network groups 102 of partition A 104, the inter-group network connections 208 between partitions B and C 104 can be used to implement pseudo-direct connections for each pair of network groups 102 of partition B 104, and the inter-group network connections 208 between partitions C and A 104 can be used to implement pseudo-direct connections for each pair of network groups 102 of partition C 104. Extending the example with an additional partition D 104, the inter-group network connections 208 between partitions A and D can be used to implement an additional pseudo-direct connection for each pair of network groups 102 of partition A 104.

It should also be appreciated that the partitions 104 may change over time (such as by changing the number of network groups 102 in a partition 104), while the physical inter-group network connections 208 remain unchanged. However, the inter-group network connections 208 can be arranged to simultaneously implement pseudo-direct connections for different size partitions 104. For example, consider a case in which partition A 104 has pseudo-direct connections implemented through the inter-group network connections 208 with partition B 104, but partition A 104 is then split into three smaller partitions 104. Similar to the previous example, the inter-group network connections 208 of the three smaller partitions 104 can be arranged to implement pseudo-direct connections between each pair of network groups 102 of each of the three smaller partitions 104, without disturbing the pseudo-direct connections of the original partition A with partition B. With such a configuration, the partitions 104 could be configured for either size and still maintain the desired pseudo-direct connections.

Figures 9, 10:
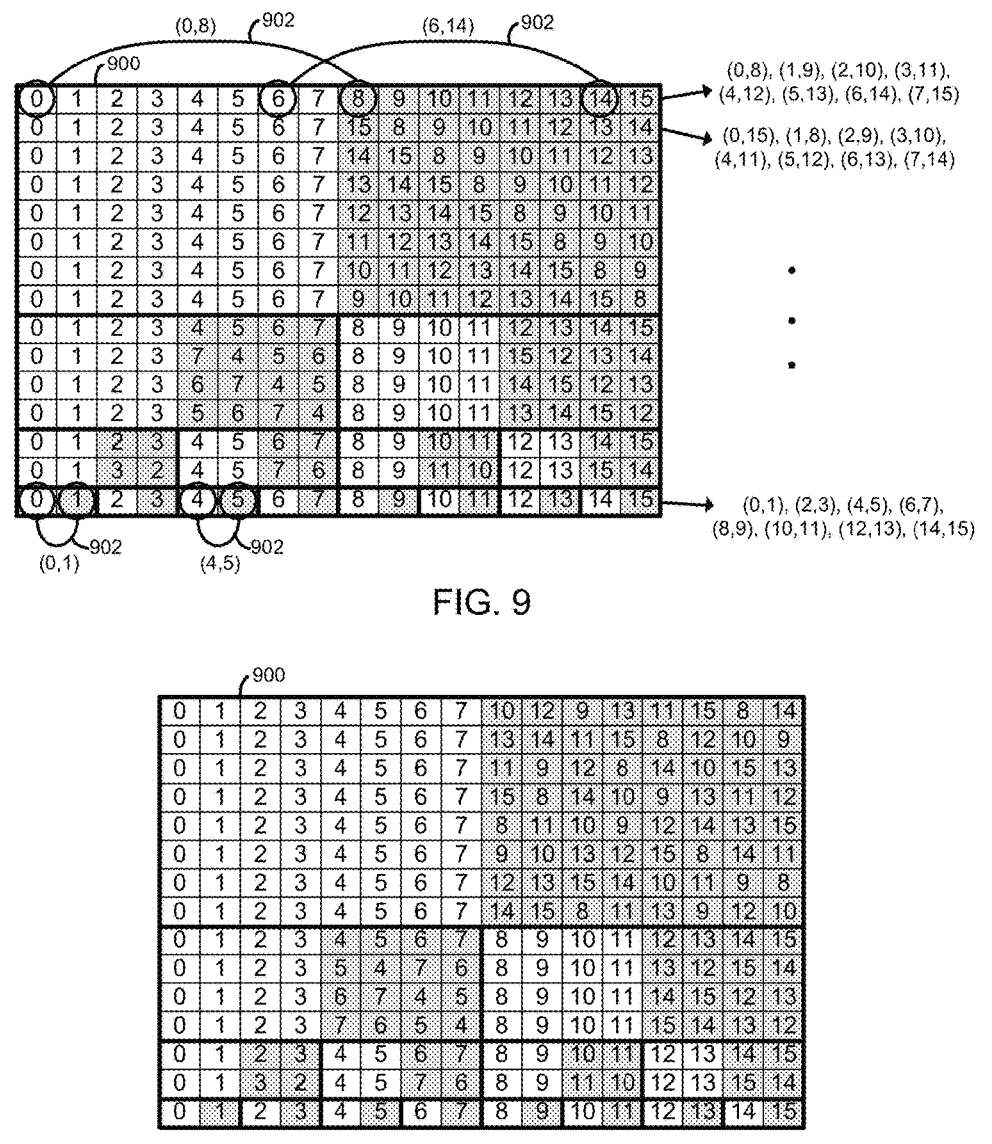

Referring now to FIG. 9, an illustrative embodiment of a connection matrix 900 can be used to determine how the pseudo-direct connections are to be configured. The connection matrix 900 is made up of several submatrices, with each submatrix outlined by a solid black line. Each submatrix includes a sequence square (shown with a white background) and a Latin square (shown with a gray background). A sequence square is an N by N matrix, wherein each row is made up of the same sequence of numbers, such as 1 to N. A Latin square, as discussed above, is an N by N matrix that has each number of N numbers appearing once in each column and in each row.

In one illustrative example, the partition 104 contains 16 network groups 102, numbered 0 to 15. The connection matrix 900 used for determining the subsets of pairs of network groups 102 for the pseudo-direct connections for such a partition 104 is constructed by first creating a submatrix of 8 rows and 16 columns, with one set of columns being equal to a sequence square (with rows having the sequence of numbers from 0 to 7) and one set of columns being equal to a Latin square (with each row and each column containing each of the numbers 8-15 exactly once). Next, this parent submatrix is used to generate two child submatrices with 4 rows and 8 columns, one with the numbers from the sequence square of the parent submatrix and one with the numbers from the Latin square of the parent submatrix. Each of the two child submatrices has a set of columns made up of a sequence square of half of the numbers of the child submatrix and a set of columns made up of a Latin square of the other half of the numbers of the child submatrix. The process of generating two additional submatrices for each submatrix is repeated until there is a row of 1×1 sequence squares and 1×1 Latin squares, as shown in FIG. 9.

While the illustrative technologies for increasing bandwidth have been described above in regard to embodiments in which the number of network groups 102 is a power of 2, it should be appreciated that a similar approach can be used for any number of network groups 102. For example, if the number of columns in a parent submatrix is odd and cannot be evenly split into two child submatrices, a "dummy" column can be added, and the procedure can proceed as above. Of course, any connections involving the "dummy" column need not actually be connected. In another example, the network groups 102 of the partition 104 can be split into sub-partitions that are each a power of two, and then each sub-partition can be connected using the method described above. For example, if there are 24 network groups 102, they can be split into a first sub-partition of 8 network groups 102 and a second sub-partition of 16 network groups 102, and then the first sub-partition and the second sub-partition can be connected as described above.

Once the connection matrix 900 has been generated, it can be used generate all of the subsets of pairs of network groups 102 used for the pseudo-direct connections that connect each possible pair of network groups 102. One such subset can be generated by each row of the connection matrix 900. To do so, the cell of each column of each sequence square in the corresponding row is paired up with the cell of the corresponding column in the corresponding Latin square. For example, in the top row of the connection matrix 900 in FIG. 9, two pairs of cells 902 are shown, (0, 8) and (6, 14). With this approach, the first row can be used to generate a subset of pairs of network groups 102, (0,8), (1,9), (2,10), (3,11), (4,12), (5,13), (6,14), and (7,15). Each row can similarly be used to generate a different subset of pairs of network groups 102. As noted above, since no network group 102 appears in a subset more than once, each subset of pairs of network groups 102 can be used to implement pseudo-direct connections with the switches 204 of a single network group 102 outside the partition 104 of the network groups 102 to be connected. As a whole, all of the subsets generated from each row of the connection matrix 900 can be used to create a pseudo-direct connection between each possible pair of network groups 102 of the selected partition 104. Note that, since there are 15 rows to implement the pseudo-direct connections for the partition 104 of 16 network groups 102, all of the subsets can be implemented with a second partition 104 of the same size (or at least 15 network groups 102). It should be appreciated that this property holds regardless of the size of the partition 104.

Of course, the subsets generated through the connection matrix 900 shown in FIG. 9 are not the only possible subsets. As seen in FIG. 10, any Latin square can be used that contains numbers corresponding to the network groups 102, and any of several known methods may be used to generate the Latin squares.

EXAMPLES

Illustrative examples of the devices, systems, and methods disclosed herein are provided below. An embodiment of the devices, systems, and methods may include any one or more, and any combination of, the examples described below.

Example 1 includes a computer network comprising a plurality of network groups, wherein each of the plurality of network groups comprises a plurality of switches; a plurality of partitions, wherein each of the plurality of partitions comprises two or more network groups of the plurality of network groups; and a plurality of network connections comprising a plurality of inter-group network connections comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups, wherein the plurality of inter-group network connections comprises a plurality of pseudo-direct connections that comprises a pseudo-direct connection for each pair of network groups that can be selected from the two or more network groups of a first partition of the plurality of partitions, wherein each of the plurality of pseudo-direct connections comprises (i) a first inter-group network connection between a first network group of the corresponding pair of network groups and an intermediate switch associated with the corresponding pseudo-direct connection and (ii) a second inter-group network connection between a second network group of the corresponding pair of network groups and the intermediate switch associated with the corresponding pseudo-direct connection.

Example 2 includes the subject matter of Example 1, and further including a plurality of intra-group network connections comprising, for each of the plurality of network groups, an intra-group network connection for each pair of switches that can be selected from the plurality of switches of the corresponding network group, wherein each of the plurality of intra-group network connections connects a first switch of the corresponding pair of switches to a second switch of the corresponding pair of switches.

Example 3 includes the subject matter of any of Examples 1 and 2, and wherein each of the intermediate switches associated with the plurality of pseudo-direct connections is not in the first partition.

Example 4 includes the subject matter of any of Examples 1-3, and wherein each of the intermediate switches associated with the plurality of pseudo-direct connections is in a second partition of the plurality of partitions different from the first partition.

Example 5 includes the subject matter of any of Examples 1-4, and wherein each of the intermediate switches associated with the plurality of pseudo-direct connections is configured to route traffic from the associated first inter-group network connection to the associated second inter-group network connection and to route traffic from the associated second inter-group network connection to the associated first inter-group network connection.

Example 6 includes the subject matter of any of Examples 1-5, and wherein each of the intermediate switches associated with the plurality of pseudo-direct connections (i) comprises a routing table and (ii) is configured to route traffic from the associated first inter-group network connection to the associated second inter-group network connection and to route traffic from the associated second inter-group network connection to the associated first inter-group network connection based on a static route in the corresponding routing table.

Example 7 includes the subject matter of any of Examples 1-6, and wherein the second partition is isolated.

Example 8 includes the subject matter of any of Examples 1-7, and wherein each of the intermediate switches associated with the plurality of pseudo-direct connections is a non-blocking switch.

Example 9 includes the subject matter of any of Examples 1-8, and wherein each of the plurality of network groups further comprises a plurality of compute devices, wherein each compute device of each plurality of compute devices is connected to at least one switch of the plurality of switches of the corresponding network group.

Example 10 includes the subject matter of any of Examples 1-9, and wherein the plurality of inter-group network connections further comprises a second plurality of pseudo-direct connections different from the plurality of pseudo-direct connections that comprises a pseudo-direct connection for each pair of network groups that can be selected from the two or more network groups of the first partition of the plurality of partitions, wherein each of the second plurality of pseudo-direct connections comprises (i) a first inter-group network connection between a first network group of the corresponding pair of network groups and an intermediate switch associated with the corresponding pseudo-direct connection and (ii) a second inter-group network connection between a second network group of the corresponding pair of network groups and the intermediate switch associated with the corresponding pseudo-direct connection.

Example 11 includes the subject matter of any of Examples 1-10, and wherein each of the intermediate switches associated with the plurality of pseudo-direct connections is in a second partition of the plurality of partitions different from the first partition and each of the intermediate switches associated with the second plurality of pseudo-direct connections is in a third partition of the plurality of partitions different from the first partition and the second partition.

Example 12 includes a compute device for configuring a computer network comprising a plurality of network groups, wherein each of the plurality of network groups comprises a plurality of switches, the compute device comprising a plurality of instructions stored thereon that, when executed by the compute device, cause the compute device to determine a plurality of partitions, wherein to determine the plurality of partitions comprises to assign, for each of the plurality of partitions, two or more network groups to the corresponding partition; determine a plurality of network connections to be connected, wherein to determine the plurality of network connections be connected comprises to determine a plurality of inter-group network connections to be connected comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups, wherein to determine the plurality of inter-group network connections to be connected comprises to determine a plurality of pseudo-direct connections to be connected that comprises a pseudo-direct connection to be connected for each pair of network groups that can be selected from the two or more network groups of a first partition of the plurality of partitions, wherein each of the plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

Example 13 includes the subject matter of Example 12, and wherein the plurality of instructions further cause the compute device to determine a plurality of intra-group network connections to be connected comprising, for each of the plurality of network groups, an intra-group network connection to be connected for each pair of switches that can be selected from the plurality of switches of the corresponding network group, wherein each of the plurality of intra-group network connections to be connected is to connect a first switch of the corresponding pair of switches to a second switch of the corresponding pair of switches.

Example 14 includes the subject matter of any of Examples 12 and 13, and wherein each of the intermediate switches associated with the plurality of pseudo-direct connections to be connected is not in the first partition.

Example 15 includes the subject matter of any of Examples 12-14, and wherein each of the intermediate switches associated with the plurality of pseudo-direct connections to be connected is in a second partition of the plurality of partitions different from the first partition.

Example 16 includes the subject matter of any of Examples 12-15, and wherein to determine the plurality of pseudo-direct connections to be connected comprises to determine a subset of pseudo-direct connections to be connected of the plurality of pseudo-direct connections to be connected, wherein to determine the subset of pseudo-direct connections to be connected comprises to determine an inter-group network connection to be connected to each of the two or more network groups of the first partition, wherein a single network group of the two or more network groups of the second partition comprises each of the intermediate switches associated with the subset of pseudo-direct connections.

Example 17 includes the subject matter of any of Examples 12-16, and wherein to determine the plurality of pseudo-direct connections to be connected comprises to construct a connection matrix, wherein the connection matrix comprises a plurality of Latin squares.

Example 18 includes the subject matter of any of Examples 12-17, and wherein to determine the subset of pseudo-direct connections to be connected comprises to determine the subset of pseudo-direct connections to be connected based on a row of the connection matrix.

Example 19 includes the subject matter of any of Examples 12-18, and wherein the second partition is isolated.

Example 20 includes the subject matter of any of Examples 12-19, and wherein to determine the plurality of inter-group network connections to be connected further comprises to determine a second plurality of pseudo-direct connections to be connected different from the first plurality that comprises a pseudo-direct connection to be connected for each pair of network groups that can be selected from the two or more network groups of the first partition of the plurality of partitions, wherein each of the second plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

Example 21 includes the subject matter of any of Examples 12-20, and wherein each of the intermediate switches associated with the plurality of pseudo-direct connections is in a second partition of the plurality of partitions different from the first partition and each of the intermediate switches associated with the plurality of pseudo-direct connections is in a third partition of the plurality of partitions different from the first partition and the second partition.

Example 22 includes a method for configuring a computer network comprising a plurality of network groups, wherein each of the plurality of network groups comprises a plurality of switches, the method comprising determining a plurality of partitions, wherein determining the plurality of partitions comprises assigning, for each of the plurality of partitions, two or more network groups to the corresponding partition; determining, by a compute device, a plurality of network connections to be connected, wherein determining the plurality of network connections be connected comprises determining a plurality of inter-group network connections to be connected comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups, wherein determining the plurality of inter-group network connections to be connected comprises determining a plurality of pseudo-direct connections to be connected that comprises a pseudo-direct connection to be connected for each pair of network groups that can be selected from the two or more network groups of a first partition of the plurality of partitions, wherein each of the plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

Example 23 includes the subject matter of Example 22, and further including determining a plurality of intra-group network connections to be connected comprising, for each of the plurality of network groups, an intra-group network connection to be connected for each pair of switches that can be selected from the plurality of switches of the corresponding network group, wherein each of the plurality of intra-group network connections to be connected is to connect a first switch of the corresponding pair of switches to a second switch of the corresponding pair of switches.

Example 24 includes the subject matter of any of Examples 22 and 23, and wherein each of the intermediate switches associated with the plurality of pseudo-direct connections to be connected is not in the first partition.

Example 25 includes the subject matter of any of Examples 22-24, and wherein each of the intermediate switches associated with the plurality of pseudo-direct connections to be connected is in a second partition of the plurality of partitions different from the first partition.

Example 26 includes the subject matter of any of Examples 22-25, and wherein determining the plurality of pseudo-direct connections to be connected comprises determining a subset of pseudo-direct connections to be connected of the plurality of pseudo-direct connections to be connected, wherein determining the subset of pseudo-direct connections to be connected comprises determining an inter-group network connection to be connected to each of the two or more network groups of the first partition, wherein a single network group of the two or more network groups of the second partition comprises each of the intermediate switches associated with the subset of pseudo-direct connections.

Example 27 includes the subject matter of any of Examples 22-26, and wherein determining the plurality of pseudo-direct connections to be connected comprises constructing a connection matrix, wherein the connection matrix comprises a plurality of Latin squares.

Example 28 includes the subject matter of any of Examples 22-27, and wherein determining the subset of pseudo-direct connections to be connected comprises determining the subset of pseudo-direct connections to be connected based on a row of the connection matrix.

Example 29 includes the subject matter of any of Examples 22-28, and wherein the second partition is isolated.

Example 30 includes the subject matter of any of Examples 22-29, and wherein determining the plurality of inter-group network connections to be connected further comprises determining a second plurality of pseudo-direct connections to be connected different from the first plurality that comprises a pseudo-direct connection to be connected for each pair of network groups that can be selected from the two or more network groups of the first partition of the plurality of partitions, wherein each of the second plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

Example 31 includes the subject matter of any of Examples 22-30, and wherein each of the intermediate switches associated with the plurality of pseudo-direct connections is in a second partition of the plurality of partitions different from the first partition and each of the intermediate switches associated with the plurality of pseudo-direct connections is in a third partition of the plurality of partitions different from the first partition and the second partition.

Example 32 includes the subject matter of any of Examples 22-31, and further including connecting each of the plurality of network connections.

Example 33 includes the subject matter of any of Examples 22-32, and further including configuring each of the intermediate switches associated with the plurality of pseudo-direct connections to route traffic from the associated first inter-group network connection to the associated second inter-group network connection and to route traffic from the associated second inter-group network connection to the associated first inter-group network connection.

Example 34 includes the subject matter of any of Examples 22-33, and wherein configuring each of the intermediate switches associated with the plurality of pseudo-direct connections to route traffic from the associated first inter-group network connection to the associated second inter-group network connection and to route traffic from the associated second inter-group network connection to the associated first inter-group network connection comprises configuring, for each of the intermediate switches associated with the plurality of pseudo-direct connections, a static route in a routing table of the corresponding intermediate switch.

Example 35 includes the subject matter of any of Examples 22-34, and wherein each of the intermediate switches associated with the plurality of pseudo-direct connections is a non-blocking switch.

Example 36 includes the subject matter of any of Examples 22-35, and wherein each of the plurality of network groups further comprises a plurality of compute devices, the method further comprising connecting each compute device of each plurality of compute devices to at least one switch of the plurality of switches of the corresponding network group.

Example 37 includes one or more computer readable media comprising a plurality of instructions stored thereon that, when executed, cause a compute device to perform the method of any of examples 22-31.

Example 38 includes a compute device for configuring a computer network comprising a plurality of network groups, wherein each of the plurality of network groups comprises a plurality of switches, the compute device comprising means for determining a plurality of partitions, wherein the means for determining the plurality of partitions comprises means for assigning, for each of the plurality of partitions, two or more network groups to the corresponding partition; means for determining a plurality of network connections to be connected, wherein the means for determining the plurality of network connections be connected comprises means for determining a plurality of inter-group network connections to be connected comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups, wherein the means for determining the plurality of inter-group network connections to be connected comprises means for determining a plurality of pseudo-direct connections to be connected that comprises a pseudo-direct connection to be connected for each pair of network groups that can be selected from the two or more network groups of a first partition of the plurality of partitions, wherein each of the plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

Example 39 includes the subject matter of Example 38, and further including means for determining a plurality of intra-group network connections to be connected comprising, for each of the plurality of network groups, an intra-group network connection to be connected for each pair of switches that can be selected from the plurality of switches of the corresponding network group, wherein each of the plurality of intra-group network connections to be connected is to connect a first switch of the corresponding pair of switches to a second switch of the corresponding pair of switches.

Example 40 includes the subject matter of any of Examples 38 and 39, and wherein each of the intermediate switches associated with the plurality of pseudo-direct connections to be connected is not in the first partition.

Example 41 includes the subject matter of any of Examples 38-40, and wherein each of the intermediate switches associated with the plurality of pseudo-direct connections to be connected is in a second partition of the plurality of partitions different from the first partition.

Example 42 includes the subject matter of any of Examples 38-41, and wherein the means for determining the plurality of pseudo-direct connections to be connected comprises means for determining a subset of pseudo-direct connections to be connected of the plurality of pseudo-direct connections to be connected, wherein the means for determining the subset of pseudo-direct connections to be connected comprises means for determining an inter-group network connection to be connected to each of the two or more network groups of the first partition, wherein a single network group of the two or more network groups of the second partition comprises each of the intermediate switches associated with the subset of pseudo-direct connections.

Example 43 includes the subject matter of any of Examples 38-42, and wherein the means for determining the plurality of pseudo-direct connections to be connected comprises means for constructing a connection matrix, wherein the connection matrix comprises a plurality of Latin squares.

Example 44 includes the subject matter of any of Examples 38-43, and wherein the means for determining the subset of pseudo-direct connections to be connected comprises means for determining the subset of pseudo-direct connections to be connected based on a row of the connection matrix.

Example 45 includes the subject matter of any of Examples 38-44, and wherein the second partition is isolated.

Example 46 includes the subject matter of any of Examples 38-45, and wherein the means for determining the plurality of inter-group network connections to be connected further comprises means for determining a second plurality of pseudo-direct connections to be connected different from the first plurality that comprises a pseudo-direct connection to be connected for each pair of network groups that can be selected from the two or more network groups of the first partition of the plurality of partitions, wherein each of the second plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

Example 47 includes the subject matter of any of Examples 38-46, and wherein each of the intermediate switches associated with the plurality of pseudo-direct connections is in a second partition of the plurality of partitions different from the first partition and each of the intermediate switches associated with the plurality of pseudo-direct connections is in a third partition of the plurality of partitions different from the first partition and the second partition.

The invention claimed is:
1. A computer network comprising:
 a plurality of network groups, wherein each of the plurality of network groups comprises a plurality of switches;
 a plurality of partitions, wherein each of the plurality of partitions comprises two or more network groups of the plurality of network groups; and
 a plurality of network connections comprising:
  a plurality of inter-group network connections comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups, wherein the plurality of inter-group network connections comprises a plurality of pseudo-direct connections that comprises a pseudo-direct connection for each pair of network groups that can be selected from the two or more network groups of a first partition of the plurality of partitions, wherein each of the plurality of pseudo-direct connections comprises (i) a first inter-group network connection between a first network group of the corresponding pair of network groups and an intermediate switch associated with the corresponding pseudo-direct connection and (ii) a second inter-group network connection between a second network group of the corresponding pair of network groups and the intermediate switch associated with the corresponding pseudo-direct connection.

2. The computer network of claim 1, further comprising a plurality of intra-group network connections comprising, for each of the plurality of network groups, an intra-group network connection for each pair of switches that can be selected from the plurality of switches of the corresponding network group, wherein each of the plurality of intra-group network connections connects a first switch of the corresponding pair of switches to a second switch of the corresponding pair of switches.

3. The computer network of claim 1, wherein each of the intermediate switches associated with the plurality of pseudo-direct connections is in a second partition of the plurality of partitions different from the first partition.

4. The computer network of claim 3, wherein each of the intermediate switches associated with the plurality of pseudo-direct connections is configured to route traffic from the associated first inter-group network connection to the associated second inter-group network connection and to route traffic from the associated second inter-group network connection to the associated first inter-group network connection.

5. The computer network of claim 4, wherein each of the intermediate switches associated with the plurality of pseudo-direct connections (i) comprises a routing table and (ii) is configured to route traffic from the associated first inter-group network connection to the associated second inter-group network connection and to route traffic from the associated second inter-group network connection to the associated first inter-group network connection based on a static route in the corresponding routing table.

6. The computer network of claim 1, wherein each of the plurality of network groups further comprises a plurality of compute devices, wherein each compute device of each plurality of compute devices is connected to at least one switch of the plurality of switches of the corresponding network group.

7. The computer network of claim 1, wherein the plurality of inter-group network connections further comprises a second plurality of pseudo-direct connections different from the plurality of pseudo-direct connections that comprises a pseudo-direct connection for each pair of network groups that can be selected from the two or more network groups of the first partition of the plurality of partitions, wherein each of the second plurality of pseudo-direct connections comprises (i) a first inter-group network connection between a first network group of the corresponding pair of network groups and an intermediate switch associated with the corresponding pseudo-direct connection and (ii) a second inter-group network connection between a second network group of the corresponding pair of network groups and the intermediate switch associated with the corresponding pseudo-direct connection.

8. The computer network of claim 7, wherein each of the intermediate switches associated with the plurality of pseudo-direct connections is in a second partition of the plurality of partitions different from the first partition and each of the intermediate switches associated with the second plurality of pseudo-direct connections is in a third partition of the plurality of partitions different from the first partition and the second partition.

9. A compute device for configuring a computer network comprising a plurality of network groups, wherein each of the plurality of network groups comprises a plurality of switches, the compute device comprising a plurality of instructions stored thereon that, when executed by the compute device, cause the compute device to:

determine a plurality of partitions, wherein to determine the plurality of partitions comprises to assign, for each of the plurality of partitions, two or more network groups to the corresponding partition;

determine a plurality of network connections to be connected, wherein to determine the plurality of network connections be connected comprises to:

determine a plurality of inter-group network connections to be connected comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups, wherein to determine the plurality of inter-group network connections to be connected comprises to determine a plurality of pseudo-direct connections to be connected that comprises a pseudo-direct connection to be connected for each pair of network groups that can be selected from the two or more network groups of a first partition of the plurality of partitions, wherein each of the plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

10. The compute device of claim 9, wherein the plurality of instructions further cause the compute device to determine a plurality of intra-group network connections to be connected comprising, for each of the plurality of network groups, an intra-group network connection to be connected for each pair of switches that can be selected from the plurality of switches of the corresponding network group, wherein each of the plurality of intra-group network connections to be connected is to connect a first switch of the corresponding pair of switches to a second switch of the corresponding pair of switches.

11. The compute device of claim 9, wherein each of the intermediate switches associated with the plurality of pseudo-direct connections to be connected is in a second partition of the plurality of partitions different from the first partition.

12. The compute device of claim 11, wherein to determine the plurality of pseudo-direct connections to be connected comprises to determine a subset of pseudo-direct connections to be connected of the plurality of pseudo-direct connections to be connected, wherein to determine the subset of pseudo-direct connections to be connected comprises to determine an inter-group network connection to be connected to each of the two or more network groups of the first partition, wherein a single network group of the two or more network groups of the second partition comprises each of the intermediate switches associated with the subset of pseudo-direct connections.

13. The compute device of claim 12, wherein to determine the plurality of pseudo-direct connections to be connected comprises to construct a connection matrix, wherein the connection matrix comprises a plurality of Latin squares.

14. The compute device of claim 9, wherein to determine the plurality of inter-group network connections to be connected further comprises to determine a second plurality of pseudo-direct connections to be connected different from the first plurality that comprises a pseudo-direct connection to be connected for each pair of network groups that can be selected from the two or more network groups of the first partition of the plurality of partitions, wherein each of the second plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

15. A method for configuring a computer network comprising a plurality of network groups, wherein each of the plurality of network groups comprises a plurality of switches, the method comprising:
   determining a plurality of partitions, wherein determining the plurality of partitions comprises assigning, for each of the plurality of partitions, two or more network groups to the corresponding partition;
   determining, by a compute device, a plurality of network connections to be connected, wherein determining the plurality of network connections be connected comprises:
      determining a plurality of inter-group network connections to be connected comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups,
      wherein determining the plurality of inter-group network connections to be connected comprises determining a plurality of pseudo-direct connections to be connected that comprises a pseudo-direct connection to be connected for each pair of network groups that can be selected from the two or more network groups of a first partition of the plurality of partitions, wherein each of the plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

16. The method of claim 15, further comprising determining a plurality of intra-group network connections to be connected comprising, for each of the plurality of network groups, an intra-group network connection to be connected for each pair of switches that can be selected from the plurality of switches of the corresponding network group, wherein each of the plurality of intra-group network connections to be connected is to connect a first switch of the corresponding pair of switches to a second switch of the corresponding pair of switches.

17. The method of claim 15, wherein each of the intermediate switches associated with the plurality of pseudo-direct connections to be connected is in a second partition of the plurality of partitions different from the first partition.

18. The method of claim 17, wherein determining the plurality of pseudo-direct connections to be connected comprises determining a subset of pseudo-direct connections to be connected of the plurality of pseudo-direct connections to be connected, wherein determining the subset of pseudo-direct connections to be connected comprises determining an inter-group network connection to be connected to each of the two or more network groups of the first partition, wherein a single network group of the two or more network groups of the second partition comprises each of the intermediate switches associated with the subset of pseudo-direct connections.

19. The method of claim 18, wherein determining the plurality of pseudo-direct connections to be connected comprises constructing a connection matrix, wherein the connection matrix comprises a plurality of Latin squares.

20. The method of claim 15, wherein determining the plurality of inter-group network connections to be connected further comprises determining a second plurality of pseudo-direct connections to be connected different from the first plurality that comprises a pseudo-direct connection to be connected for each pair of network groups that can be selected from the two or more network groups of the first partition of the plurality of partitions, wherein each of the second plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

21. The method of claim 20, wherein each of the intermediate switches associated with the plurality of pseudo-direct connections is in a second partition of the plurality of partitions different from the first partition and each of the intermediate switches associated with the plurality of pseudo-direct connections is in a third partition of the plurality of partitions different from the first partition and the second partition.

22. The method of claim 15, further comprising connecting each of the plurality of network connections.

23. The method of claim 22, further comprising configuring each of the intermediate switches associated with the plurality of pseudo-direct connections to route traffic from the associated first inter-group network connection to the associated second inter-group network connection and to route traffic from the associated second inter-group network connection to the associated first inter-group network connection.

24. A compute device for configuring a computer network comprising a plurality of network groups, wherein each of the plurality of network groups comprises a plurality of switches, the compute device comprising:
  a physical processor;
  means for determining a plurality of partitions, wherein the means for determining the plurality of partitions comprises means for assigning, for each of the plurality of partitions, two or more network groups to the corresponding partition;
  means for determining a plurality of network connections to be connected, wherein the means for determining the plurality of network connections be connected comprises:
    means for determining a plurality of inter-group network connections to be connected comprising an inter-group network connection for each pair of network groups that can be selected from the plurality of network groups, wherein each of the plurality of inter-group network connections connects a first switch of a first network group of the corresponding pair of network groups to a second switch of a second network group of the corresponding pair of network groups,
  wherein the means for determining the plurality of inter-group network connections to be connected comprises means for determining a plurality of pseudo-direct connections to be connected that comprises a pseudo-direct connection to be connected for each pair of network groups that can be selected from the two or more network groups of a first partition of the plurality of partitions, wherein each of the plurality of pseudo-direct connections to be connected comprises (i) a first inter-group network connection to be connected between a first network group of the corresponding pair of network groups and an intermediate switch associated with the corresponding pseudo-direct connection and (ii) a second inter-group network connection to be connected between a second network group of the corresponding pair of network groups and the intermediate switch associated with the corresponding pseudo-direct connection.

25. The compute device of claim 24, further comprising means for determining a plurality of intra-group network connections to be connected comprising, for each of the plurality of network groups, an intra-group network connection to be connected for each pair of switches that can be selected from the plurality of switches of the corresponding network group, wherein each of the plurality of intra-group network connections to be connected is to connect a first switch of the corresponding pair of switches to a second switch of the corresponding pair of switches.

* * * * *